(12) United States Patent
Wiberg et al.

(10) Patent No.: US 9,094,942 B2
(45) Date of Patent: Jul. 28, 2015

(54) METHODS AND ARRANGEMENTS FOR CONTENTION-BASED UPLINK TRANSMISSION IN A WIRELESS COMMUNICATIONS SYSTEM

(75) Inventors: Niclas Wiberg, Linköping (SE); Eva Englund, Linköping (SE); Erik Eriksson, Linköping (SE); Pontus Wallentin, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 57 days.

(21) Appl. No.: 13/580,549

(22) PCT Filed: Feb. 22, 2010

(86) PCT No.: PCT/SE2010/050199
§ 371 (c)(1),
(2), (4) Date: Aug. 22, 2012

(87) PCT Pub. No.: WO2011/102764
PCT Pub. Date: Aug. 25, 2011

(65) Prior Publication Data
US 2012/0314619 A1    Dec. 13, 2012

(51) Int. Cl.
*H04W 74/00* (2009.01)
*H04W 74/08* (2009.01)

(52) U.S. Cl.
CPC ........ *H04W 74/006* (2013.01); *H04W 74/0833* (2013.01)

(58) Field of Classification Search
CPC ............ H04W 74/08; H04W 74/0833; H04W 74/006; H04L 12/413
USPC .................................................. 370/310, 344
See application file for complete search history.

(56) References Cited

U.S. PATENT DOCUMENTS 7,039,032 B1 * 5/2006 Ho et al. ....................... 370/338
7,801,040 B1 * 9/2010 Singh et al. ................ 370/230.1
(Continued)

FOREIGN PATENT DOCUMENTS

| CN | 101411240 A | 4/2009 |
| WO | 2007/051910 A1 | 5/2007 |
| WO | 2007/078177 A1 | 7/2007 |

OTHER PUBLICATIONS

3rd Generation Partnership Project. "Contention Based Uplink Transmissions." 3GPP TSG-RAN WG2 #66bis, R2-093812, Los Angeles, USA, Jun. 29-Jul. 3, 2009.
(Continued)

*Primary Examiner* — Jay P Patel
(74) *Attorney, Agent, or Firm* — Murphy, Bilak & Homiller, PLLC (57) ABSTRACT

The present invention relates to a user equipment and a radio base station, and to related methods of enabling contention-based uplink transmission. The method comprises the steps of determining (210) configuration information for at least one contention-based uplink transmission opportunity, transmitting (220) the configuration information to at least one user equipment, and for each of the at least one contention-based uplink transmission opportunity, transmitting (230) an access control signal to the at least one user equipment, indicating whether contention-based uplink transmission is allowed for the opportunity.

19 Claims, 6 Drawing Sheets

(56) References Cited

U.S. PATENT DOCUMENTS

| | | | |
|---|---|---|---|
| 8,553,714 B2* | 10/2013 | Chu et al. | 370/461 |
| 2004/0038697 A1* | 2/2004 | Attar et al. | 455/522 |
| 2008/0267126 A1* | 10/2008 | Vujcic et al. | 370/330 |
| 2011/0098035 A1* | 4/2011 | Frenger et al. | 455/423 |
| 2011/0176500 A1* | 7/2011 | Wager et al. | 370/329 |
| 2011/0261763 A1* | 10/2011 | Chun et al. | 370/329 |
| 2011/0274040 A1* | 11/2011 | Pani et al. | 370/328 |
| 2012/0008600 A1* | 1/2012 | Marinier et al. | 370/336 |
| 2012/0113938 A1* | 5/2012 | Larsson et al. | 370/329 |
| 2012/0182977 A1* | 7/2012 | Hooli et al. | 370/336 |
| 2013/0128871 A1* | 5/2013 | Suzuki et al. | 370/336 |
| 2013/0294337 A1* | 11/2013 | Damnjanovic et al. | 370/328 |

OTHER PUBLICATIONS

Unknown, Author, "Impacts of contention based uplink in RAN2", Ericsson, ST-Ericsson, 3GPP TSG-RAN WG2 #68bis, R2-100125, Valencia, Spain, Jan. 18-22, 2010, 1-3.

Unknown, Author, "Stage 2 description of the contention based uplink- Change Request", Ericsson, ST-Ericsson, 3GPP TSG-RAN2 Meeting #68bis, R2-100126, Valencia, Spain, Jan. 18-22, 2010, 1-2.

* cited by examiner

METHODS AND ARRANGEMENTS FOR CONTENTION-BASED UPLINK TRANSMISSION IN A WIRELESS COMMUNICATIONS SYSTEM

TECHNICAL FIELD

The present invention relates to contention-based uplink transmission in a wireless communications system. More particularly, the present invention relates to a radio base station, a user equipment and methods of enabling contention-based uplink transmission.

BACKGROUND

Figure 1A:
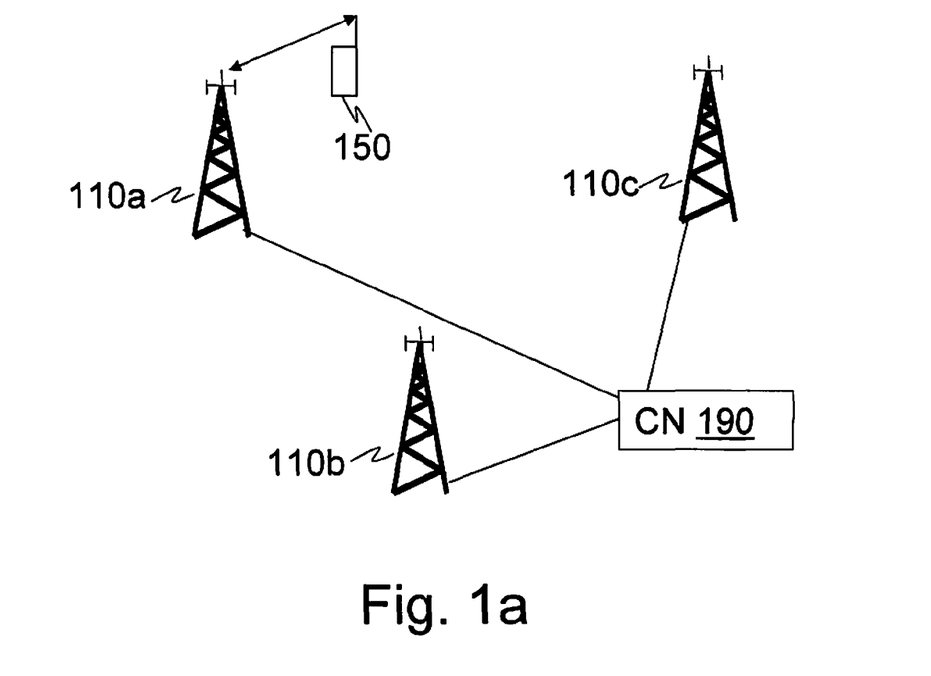
FIG. 1a illustrates schematically a part of a conventional wireless communication system wherein the present invention may be implemented.

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to to improve the UMTS standard to cope with future requirements in terms of improved services such as higher data rates, improved efficiency, lowered costs etc. The Universal Terrestrial Radio Access Network (UTRAN) is the radio access network of a UMTS and evolved UTRAN (E-UTRAN) is the radio access network of an LTE system. In an E-UTRAN, a user equipment (UE) 150 is wirelessly connected to a radio base station (RBS) 110a-c commonly referred to as an eNodeB (eNB), as illustrated in FIG. 1a. The eNBs 110a-c are directly connected to the core network (CN) 190 via the S1 interface. In UTRAN however, the radio base stations or NodeBs (NB) are connected to the CN via a Radio Network Controller (RNC) which controls the NBs connected to it.

In the first release of the E-UTRAN, network-scheduled resources are used for all uplink data transmissions. A UE that wants to initiate uplink transmission must first request uplink resources by transmitting a scheduling request, either in a random access procedure or through a dedicated scheduling request. The eNB will select the resource blocks to be assigned to the user and will return a scheduling grant indicating the selected resources. Once the UE has received the scheduling grant it can start uplink data transmission on the assigned uplink resources. This procedure causes an extra delay for uplink data packets in cases when the UE is not currently scheduled at the time the data becomes available. The delay is due to that the UE has to request a scheduling from the network and wait for the scheduling grant before being able to transmit the data.

To reduce the delay it has been proposed in 3GPP to also introduce a contention-based (CB) uplink transmission scheme. CB transmission schemes can provide good performance when the load is low, although the risk of collisions may lower the performance at a high load. One scheme that has been proposed is that the eNB repeatedly transmits uplink scheduling grants, so called CB grants, that are similar to normal scheduling grants, with the exception that a CB grant is applicable to multiple UEs and not only to one as in the case of a normal scheduling grant. A UE that needs to transmit uplink data when not being scheduled, may thus use such a CB grant and its assigned resources for uplink transmission. Between the CB grant and the actual uplink transmission, there is a fixed time delay of 4 ms or more. A collision may occur when several UEs use the same CB grant for their uplink transmission, which will typically result in a reception error as the eNB will not be able to decode data transmitted by several UEs in a same resource. By choosing whether to transmit a CB grant or not, the base station can decide for each sub frame which uplink resources that may be used for regular scheduled transmissions and which ones that may be used for contention-based access.

To reduce the UE power consumption, a UE is normally configured to shut down its receiver when there is little or no activity. This feature is called discontinuous reception (DRX). Likewise, to reduce the base station power consumption and decrease interference, the eNB may be configured to turn off its transmission when there is little or no activity, which is referred to as discontinuous transmission (DTX).

However, a UE that want to use CB uplink transmissions will also need to use DRX in order to save power consumption, which will prevent the UE from continuously receiving the CB grants from the eNB. Therefore, when new data or data packets arrive for uplink transmission, the UE will typically not have received any CB grants recently. The UE will thus have to wait for the next CB grant to be received and processed before performing its uplink transmission, which will thus cause an unwanted delay for accessing the uplink resources, in addition to the fixed delay between grant and transmission of 4 ms.

Furthermore, the proposed scheme requires that the eNB repeatedly transmits CB grants. One problem with this scheme is thus that downlink transmission resources will be used for CB grants that in many cases will not result in any transmission, thus wasting transmission capacity, and creating unnecessary interference. Another problem is that the transmission of CB grants may hinder the usage of DTX in a situation with little or no other activity, which will thereby increase the eNB power consumption and the interference.

SUMMARY

The object of the present invention is to address some of the problems and disadvantages outlined above, and to enable an improved contention-based uplink transmission. This object and others are achieved by the methods and devices according to the independent claims, and by the embodiments according to the dependent claims.

In accordance with a first aspect of the present invention, a method for a radio base station in a wireless communications system, of enabling contention-based uplink transmission is provided. The method comprises the steps of determining configuration information for at least one contention-based uplink transmission opportunity, and transmitting the configuration information to at least one user equipment. The method also comprises, for each of the at least one contention-based uplink transmission opportunities, the step of transmitting an access control signal to the at least one user equipment, indicating whether contention-based uplink transmission is allowed for the opportunity.

In accordance with a second aspect of the present invention, a method for a user equipment in a wireless communications system, of enabling contention-based uplink transmission is provided. The method comprises the steps of receiving and storing configuration information for at least one contention-based uplink transmission opportunity, wherein the configuration information is received from a radio base station. The method also comprises the step of receiving input data for uplink transmission, and the step of reading an access control signal associated with one of the at least one contention-based uplink transmission opportunities. The access control signal is received from the radio base station and indicates whether contention-based uplink transmission is allowed for the associated opportunity.

In accordance with a third aspect of the present invention, a radio base station configured to enable contention-based uplink transmission in a wireless communications system is provided. The radio base station comprises a determining unit adapted to determine configuration information for at least one contention-based uplink transmission opportunity, and a transmitter adapted to transmit the configuration information to at least one user equipment. The transmitter is also adapted to transmit an access control signal to the at least one user equipment for each of the at least one contention-based uplink transmission opportunities. The access control signal indicates whether contention-based uplink transmission is allowed for the opportunity.

In accordance with a fourth aspect of the present invention, a user equipment configured to enable contention-based uplink transmission in a wireless communications system is provided. The user equipment comprises a receiver adapted to receive configuration information for at least one contention-based uplink transmission opportunity from a radio base station. It also comprises a storage adapted to store the received configuration information, and a data input unit adapted to receive input data for uplink transmission. Furthermore, the user equipment comprises a reading unit adapted to read an access control signal received from the radio base station and associated with one of the at least one contention-based uplink transmission opportunities. The access control signal indicates whether contention-based uplink transmission is allowed for the associated opportunity.

An advantage of embodiments of the present invention is that the access delay for contention-based uplink transmission is reduced.

A further advantage of embodiments of the present invention is that it reduces the usage of downlink transmission resources for grants of contention-based uplink transmission, thereby also reducing the downlink interference.

Still another advantage of embodiments of the present invention is that the network power consumption is reduced.

Furthermore, an advantage of embodiments of the present invention is that the load of contention-based uplink transmissions may be controlled.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular embodiments of the invention are described in a non-limiting general context in relation to an E-UTRAN. It should though be noted that the invention and its exemplary embodiments may also be applied to other types of radio access networks such as UTRAN, WiMax and GSM.

In embodiments of the present invention, the problem of the access delay for contention-based (CB) uplink transmission, as well as the problem of high usage of downlink transmission resources and increased network power consumption due to frequently transmitted CB grants, are addressed by a solution where CB uplink transmission opportunities are signaled by the network to the UEs in two steps. In a first step, the eNB determines configuration information such as radio resources and transmission formats that should be used for a number of potential future CB uplink transmission opportunities, and transmits the configuration information for all of these opportunities to the UEs. In a second step, an access control signal transmitted to the UEs indicates for each such potential opportunity whether the opportunity is actually available or not. The access control signal may e.g. consist of a single flag that is transmitted only when it indicates that the opportunity is not available, which thus makes the access control signaling very resource efficient. A UE may thus receive and store relevant configuration information for coming CB uplink transmission opportunities transmitted by the eNB, and when the UE receives input data and therefore wishes to use one of the CB uplink transmission opportunities, it checks whether that opportunity is available or not by reading the access control signal.

Figure 1B:
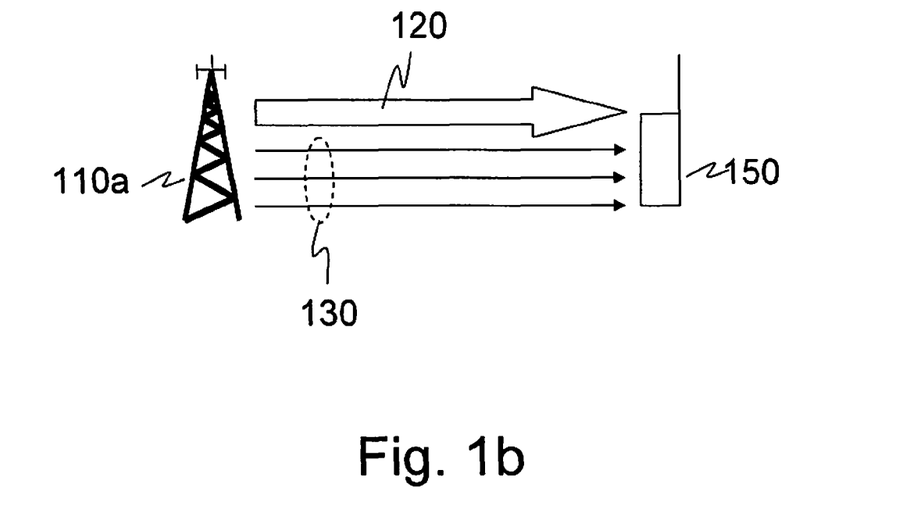
FIG. 1b schematically illustrates the signaling between the eNB and the UE according to embodiments of the present invention.

FIG. 1b schematically illustrates the signaling between the eNB 110a and the UE 150 according to embodiments of the present invention. A larger (with regards to the downlink resource usage) message 120 comprising configuration information which may be applicable for several CB uplink transmission opportunities is transmitted in a first step, while several resource efficient access control signals 130—one for each CB uplink transmission opportunity—are transmitted in a second step. This should be compared with conventional CB uplink transmission enabled by repeatedly transmitting CB grants to all the UEs comprising configuration information for one upcoming CB uplink transmission each, which may be a waste of resources especially at times when no UEs wish to use CB access.

The configuration information may be partly or wholly pre-determined in order to reduce the signaling even more. However for a maximum of flexibility, all configuration information may be determined and configured by the eNB. The configuration information for the CB uplink transmission opportunities, determined by the eNB for a number of CB uplink transmission opportunities and transmitted to the UEs, may comprise one or more of:

Timing information, i.e. information regarding which sub frames that may be used for CB access, for instance given as a sub frame periodicity with a specified time offset (e.g. every sub frame, or every second sub frame where the time offset indicates if it is even or uneven sub frames that should be used), but also information regarding the duration of the validity of the configuration information, e.g. that it is valid during a specified time, or that it is valid until a new configuration information message is transmitted by the eNB.

The uplink transmission resources, i.e. the resource blocks to be used for CB uplink transmission for instance given as an index of a first resource block together with a total number of resource blocks. There are many alternative ways of determining the resources to use for the uplink transmission opportunities. In one embodiment of the present invention, all uplink resources that are available for scheduling may be allocated to a CB uplink transmission opportunity. In an alternative embodiment, a subset of the resources may be allocated to the opportunity. In still another alternative embodiment, the resources may be divided and allocated to multiple transmission opportunities that the UEs may select between.

The format of the uplink transmission in terms of the modulation and coding scheme to use when transmitting. This information together with the information about the amount of resource blocks used (see above) indicate how much data that will be possible to transmit during one transmission opportunity and what level of robustness that will be used. There may be different alternatives for the modulation and coding schemes that the UE may choose between, in order to support different traffic needs and radio conditions.

The maximum number of successive CB uplink transmissions. If the UE has a larger amount of data that it wants to transmit, a dedicated scheduling of resources may be advantageous. By specifying a maximum number of successive CB uplink transmissions that a UE may use, the UE is forced to wait for a dedicated scheduling after this maximum number of successive CB uplink transmissions.

The access probability that a UE should apply before transmitting. The UE may e.g. generate a random value between 0 and 1 and compare this random value against the access probability. If the access probability is set to 90%, then all generated random values between 0 and 0.9 indicates that the UE is allowed to access the CB uplink transmission resources. Such an access probability may also be indicated in the access control signal, if the access probability is preferably specified for each transmission opportunity instead of for all transmission opportunities together (see also description below).

Information on how the access control signal is transmitted, e.g. which channel resource that is used for the access control signal. This information is used by the UE that wishes to use a CB uplink transmission opportunity, in order for it to know how to read the access control signal for the opportunity.

What logical channels or groups of logical channels that may use CB transmissions. If a UE has several configured radio data bearers with different priorities, e.g. one for real time data and one for signaling data, it may be possible to indicate that the CB uplink transmission opportunities only may be used for e.g. real time data and not for signaling data.

The transmission of the configuration information may be done by the radio-resource control (RRC) layer or by a combination of the RRC and the medium access control (MAC) layer, where some of the configuration information is transmitted with RRC and some with MAC. The advantage of using RRC is that it offers flexibility, while the advantage of MAC is that it is fast. For RRC, either system information broadcasted by the eNBs, or dedicated configuration messages may be used to carry the configuration information.

In one exemplary embodiment, RRC could be used to transmit information about the sub frames to use for contention-based uplink transmission, together with information enabling the UEs to find the configuration information transmitted with MAC. One alternative when using MAC, may be to use semi-persistent scheduling (SPS) grants, and the RRC configuration information may then provide a specific radio network temporary identifier (RNTI) indicating the SPS grants that are used for CB configuration information. The MAC SPS grants may e.g. include information about resource blocks and format to use.

When the eNB has determined the configuration information and has transmitted it to the UEs, it evaluates for each of the upcoming transmission opportunities if the opportunity is actually available or not, and transmits an access control signal to the UEs to indicate the result of the evaluation. The access control signal thus indicates to a UE if it may have access to the CB uplink transmission resources, i.e. if a CB uplink transmission is allowed for the associated opportunity.

There may be several alternative ways for the eNB to evaluate if a CB uplink transmission opportunity is available or not, and to determine the value of the access control signal:

CB access may be allowed in sub frames where there is no other uplink traffic scheduled and not allowed in sub frames where there is regular scheduled uplink traffic. This alternative may be particularly useful in cases when the configuration information comprises the information that all the uplink resources should be used for the CB uplink transmission opportunity.

In cases where a subset of the uplink resources are configured for CB access, the eNB can choose to forbid CB access only when those particular resources are scheduled for regular uplink transmission. The uplink scheduler can thus still allow CB access when only a smaller amount of the uplink resources are needed for regular scheduling.

For the case when the resources are divided and allocated to multiple transmission opportunities that the UEs may select between, the opportunities may be controlled independently of each other or together. A CB access may be allowed on the resources that are not currently used for regular scheduling. The uplink scheduler may determine how many of the transmission opportunities that should be indicated as allowed for CB access, and how many that are needed for regular scheduling and thus not allowed for CB access. There may thus in this case be either several control access signals, one for each opportunity, or one more complex control access signal with for example a bit set telling what resources that may be used.

CB access may also be forbidden when the CB access load is too high, i.e. when the number of recent CB uplink transmissions has exceeded a threshold. Alternatively, the CB access control uses a probability, which is determined by the recent CB access load. A high load results in a low access probability and vice versa.

The access control signal needs to be transmitted before the associated uplink transmission opportunity, and it should be as close to the transmission opportunity in time as possible to avoid unnecessary access delays.

In one embodiment of the present invention, the access control signal is a single flag, indicating "CB ACCESS ALLOWED" or "CB ACCESS NOT ALLOWED". Alternatively, discontinuous transmission (DTX) may be used to signal one of the two access control signal values. As already described above, the eNB may use DTX at low load, i.e. it may turn off its transmission at low load in order to reduce the energy consumption and the interference. Therefore, the eNB may preferably indicate the "CB ACCESS ALLOWED" value by turning off the transmission, as a CB access is more likely to be allowed at low load.

In an alternative embodiment of the present invention using more elaborate schemes, the access control signal may also indicate an access probability by a load control value between zero and one. Zero would indicate "CB ACCESS NOT ALLOWED" and one would indicate full access or "CB ACCESS ALLOWED", while values in between could be interpreted as the probability that the CB uplink transmission is allowed. The UE would then have to generate a random number between 0 and 1, compare the random number with the load control value, and only access the CB uplink transmission resources when the random value is below the load control value. By changing the load control value or the value of the access control signal, the UEs will get a larger or smaller probability for access, which will thus give a possibility of controlling the load due to CB uplink transmissions. As already described above, an access probability may alternatively be comprised in the configuration information that is first transmitted to the UEs, and will in that case be valid for all the transmission opportunities, while an access probability in the access control signal will be valid for the corresponding transmission opportunity only.

In one embodiment of the present invention, the access control signal could be transmitted using the same transmission scheme as an LTE standardized physical hybrid automatic repeat request indicator channel (PHICH), by using an otherwise unused PHICH resource. In an alternative embodiment, the access control signal could be sent using otherwise unused control-channel elements in the physical downlink control channel (PDCCH).

When user input data is received in the UE for uplink transmission and the UE is not currently scheduled for uplink transmissions, the UE evaluates the possibility of doing CB uplink transmission by reading the access control signal sent from the eNB. If the access control signal indicates that transmission is allowed, the UE performs a CB uplink transmission. As already stated above, the UE may have to generate a random variable and compare with a configured or signaled probability, to determine if the CB access is allowed.

In the evaluation of the possibility of doing a CB uplink transmission, the UE may also check if the amount of buffered data is below a threshold. A CB access may only be allowed if the buffer size is less than the threshold, as the gain from CB access may be too small compared to the cost when the buffer is large. The threshold may for example be defined as n*CB transport block size where n is an integer.

If the UE performs a CB uplink transmission, and still has input data in the buffer afterwards, it may or may not perform additional CB uplink transmissions. For instance, the configuration information may include a limit to the number of successive CB transmissions used by one UE, as explained above. Alternatively, the UE may have to wait a certain time before doing an additional CB uplink transmission.

If the access control signal indicates that CB uplink transmission is not allowed, the UE may instead apply the conventional scheduling steps, i.e. to send a scheduling request or a random access and wait for a scheduling grant before transmitting.

As already described above, the UE will only attempt a CB access when it does not regard itself as scheduled. However, there are several alternatives for how the UE decides when a CB access will be attempted, i.e. when it regards itself as not scheduled. The following is a list of possible alternatives:

A CB uplink transmission may be used with the same access control procedure as for a regular scheduling request, i.e. when the UE has triggered a regular buffer status report. This means that the UE may attempt a CB access if user input data of a higher priority than previously reported arrive in the UE buffer, or if input data arrives and the UE buffer is empty. A CB uplink transmission resource may in this case be used until a regular scheduling grant is received.

A CB uplink transmission may be triggered if the UE does not have a valid scheduling grant for the current sub frame.

A CB uplink transmission may be triggered if the UE does not have any valid scheduling grants for future sub frames.

In other alternatives granted transport formats may also be considered.

Figure 2:
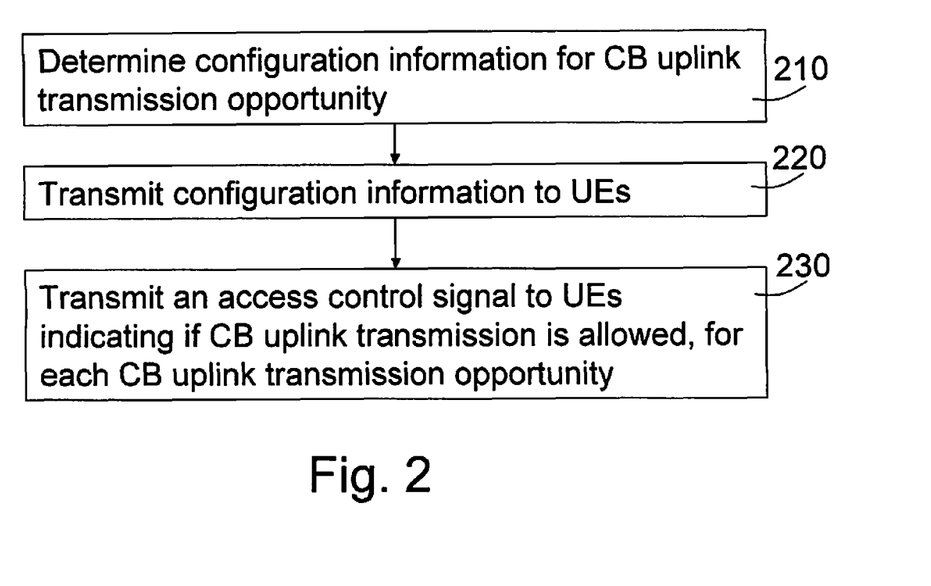
FIG. 2 is a flowchart of the method performed by the eNB according to embodiments of the present invention.

FIG. 2 is a flowchart of the method performed by the eNB according to embodiments of the present invention. The method comprises the following steps:

210: Determine configuration information for one or more contention-based uplink transmission opportunities. According to one embodiment of the present invention, the configuration information for the CB uplink transmission opportunities determined by the eNB, comprises timing information as well as the uplink transmission resources and format to use for the CB uplink transmission opportunities.

220: Transmit the configuration information to the UEs that the eNB serves. Either RRC or a combination of RRC and MAC may be used for transmitting the configuration information. When using RRC, the configuration information may be transmitted using system information broadcasting in one embodiment, and using dedicated configuration messages in an alternative embodiment.

230: Transmit an access control signal to the UEs, for each of the CB uplink transmission opportunities. The access control signal indicates whether CB uplink transmission is allowed for the opportunity or not. It may alternatively indicate a probability that a CB access is allowed for the opportunity. The UE that wishes to use a CB uplink transmission may thus read the access control signal to determine if a CB access is possible for the opportunity. In one embodiment, the access control signal is transmitted in the sub frame just before the uplink transmission sub frame of the opportunity, in order to minimize the delay as much as possible. As stated above, the access control signal may be transmitted on a PHICH or on a PDCCH.

Figure 3A:
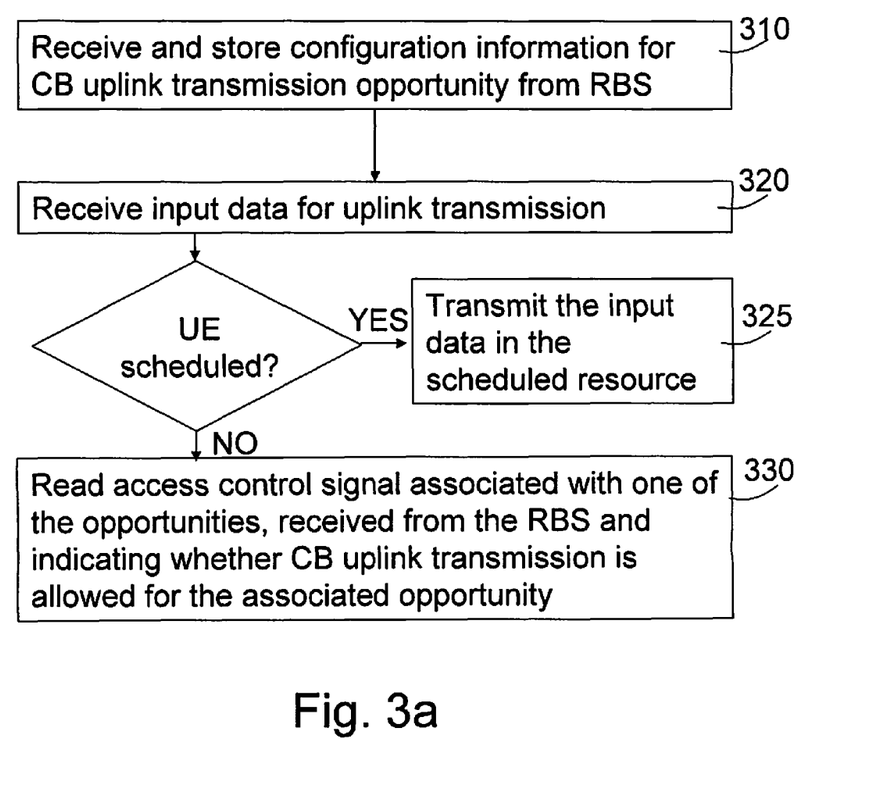
FIGS. 3a-b are flowcharts of the method performed by the UE according to embodiments of the present invention.

FIG. 3a is a flowchart of the method performed by the UE according to embodiments of the present invention. The method comprises the following steps:

310: Receive and store configuration information for one or more CB uplink transmission opportunities. The configuration information is received from the eNB, and according to one embodiment of the present invention the information comprises timing information as well as the uplink transmission resources and format to use for the CB uplink transmission opportunities. According to one embodiment the UE receives the information with system information broadcasting, and according to an alternative embodiment with a dedicated configuration message.

320: Receive input data for uplink transmission, via the user interface of the UE. This triggers the UE to check if it is scheduled or not, and if it is already scheduled, it may use the scheduled resources to transmit 325 the input data.

330: When the UE is not scheduled for uplink transmission, it will attempt a CB access, and will read the access control signal associated with the next CB uplink transmission opportunity received from the eNB on the PHICH or the PDCCH e.g. The access control signal indicates whether CB uplink transmission is allowed for the associated opportunity or not. In one embodiment, the access control signal is received in the sub frame just before the uplink transmission sub frame of the opportunity, in order to minimize the delay as much as possible.

Figure 3B:
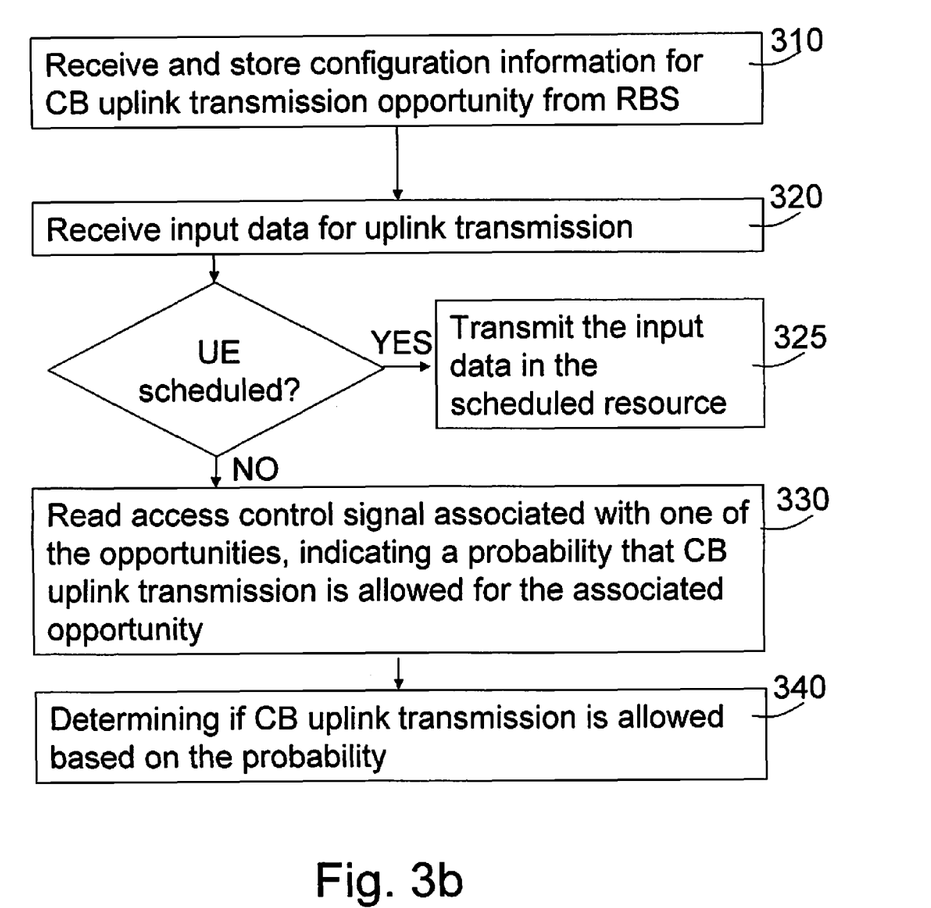

FIG. 3b is a flowchart of the method performed by the UE according to embodiments of the present invention. The flowchart comprises the following steps in addition to steps 310 and 320 already described with reference to FIG. 3a above:

330: When the UE is not scheduled for uplink transmission, it will attempt a CB access, and will read the access control signal associated with the next CB uplink transmission opportunity as already described above. However, in this embodiment the access control signal indicates a probability that CB uplink transmission is allowed for the associated opportunity. This probability may for example be expressed as a value between 0 and 1.

340: The UE has to determine whether CB uplink transmission is allowed for the associated opportunity based on the probability in this embodiment. E.g the UE may generate a random number between 0 and 1, compare the random number with the probability value, and only access the CB uplink transmission resources when the random value is below the probability value.

Figure 4A:
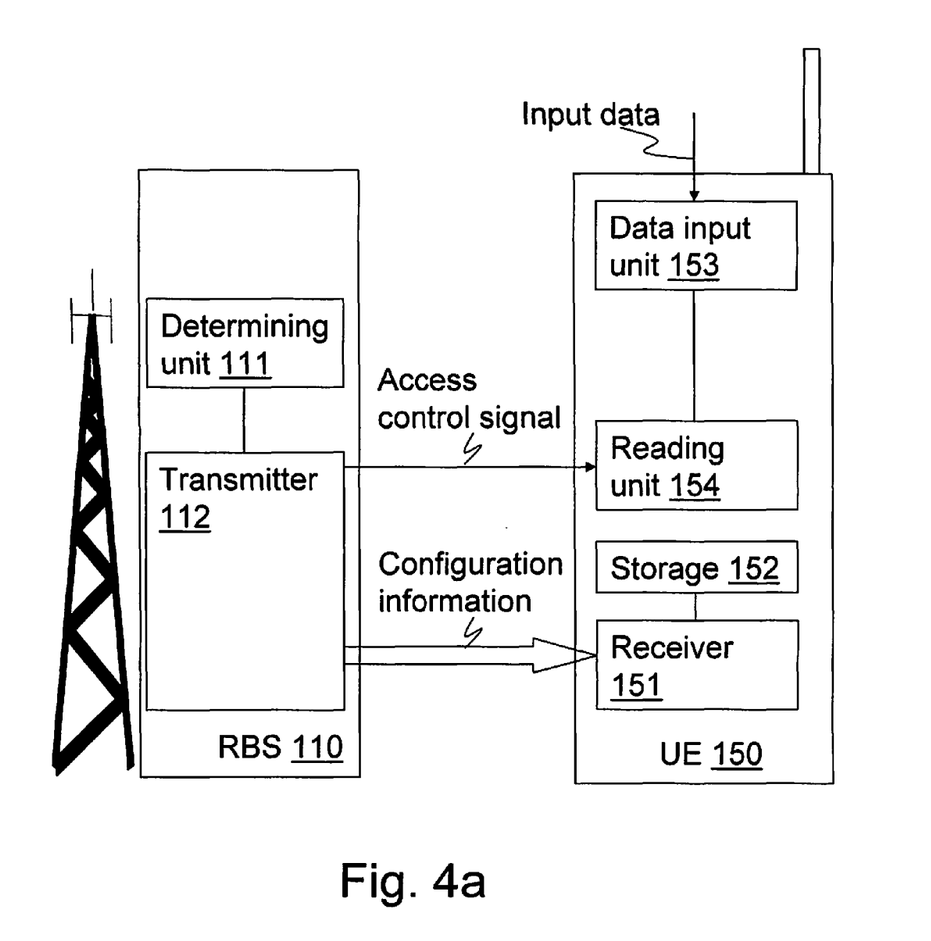
FIGS. 4a-b illustrate schematically a radio base station and a user equipment according to embodiments of the present invention.

The eNB 110 and the UE 150 are schematically illustrated in FIG. 4a, according to embodiments of the present invention. The eNB 110 comprises a determining unit 111 adapted to determine configuration information for at least one CB uplink transmission opportunity, and a transmitter 112 adapted to transmit the configuration information to at least one UE. In one embodiment the configuration information is broadcasted in the system information, and in another embodiment it is transmitted in dedicated configuration messages. The configuration information may comprise timing information as well as the uplink transmission resources and format to use for the CB uplink transmission opportunities. The transmitter 112 is also adapted to transmit an access control signal to the at least one UE for each of the CB uplink transmission opportunities. The signal may e.g. be transmitted on PHICH or PDCCH. The access control signal indicates whether contention-based uplink transmission is allowed for the opportunity, and in one embodiment it indicates a probability that the CB access is allowed. The access control signal is in one embodiment transmitted in a sub frame immediately preceding the sub frame used for the CB uplink transmission of the related opportunity.

The UE 150 comprises a receiver 151 adapted to receive configuration information for at least one CB uplink transmission opportunity from the eNB 110, and a storage 152 to store the received configuration information. It also comprises a data input unit 153 adapted to receive input data for uplink transmission, and a reading unit 154 for reading the access control signal received from the eNB 110 when the UE is not scheduled for uplink transmission, each access control signal being associated with a CB uplink transmission opportunity. The access control signal indicates whether CB uplink transmission is allowed for the associated opportunity.

Figure 4B:
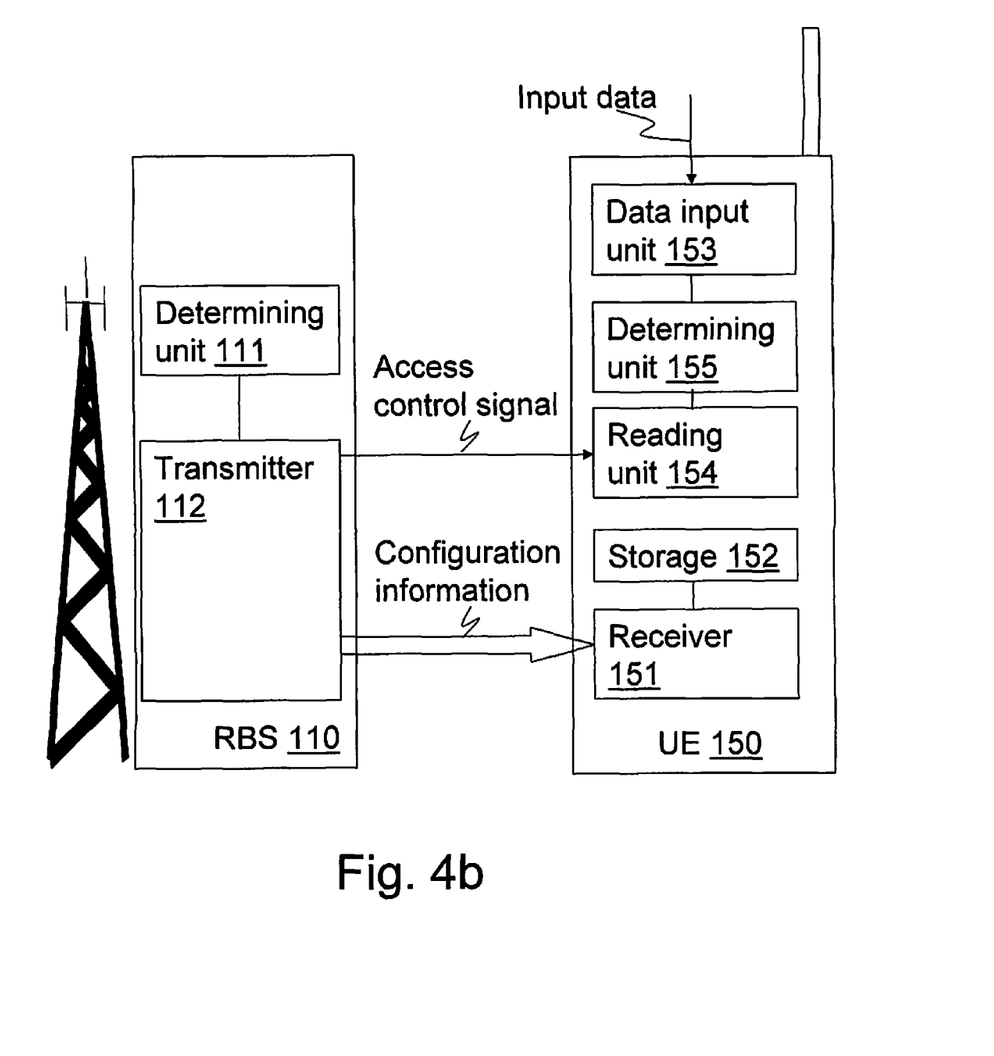

In an alternative embodiment, the access control signal indicates a probability that CB uplink transmission is allowed for the associated opportunity. This offers a way to control the CB access load in the system. In this embodiment, schematically illustrated in FIG. 4b, the UE 150 also comprises a determining unit 155 for determining whether CB uplink transmission is allowed for the associated opportunity based on the probability indicated by the access control signal. One example of how the UE may determine whether CB access is allowed is to generate a random number between 0 and 1, compare the random number with the probability value, and only access the CB uplink transmission resources when the random value is below the probability value.

The units described above with reference to FIG. 4a-b are logical units and do not necessarily correspond to separate physical units. Furthermore, the above mentioned and described embodiments are only given as examples and should not be limiting to the present invention. Other solutions, uses, objectives, and functions within the scope of the invention as claimed in the accompanying patent claims should be apparent for the person skilled in the art.

Abbreviations

3GPP 3rd Generation Partnership Program
ARQ Automatic Request for Repeat
CB Contention Based
CN Core Network
DRX Discontinuous Reception
DTX Discontinuous Transmission
eNB Evolved Node B
E-UTRAN Evolved UTRAN
LTE Long Term Evolution
MAC Medium Access Control
NB NodeB
PDCCH Physical Downlink Control Channel
PHICH Physical Hybrid-ARQ Indicator Channel
RAN Radio Access Network
RBS Radio Base Station
RNC Radio Network Controller
RNTI Radio-Network Temporary Identifier
RRC Radio Resource Control
SPS Semi-Persistent Scheduling
UE User Equipment
UMTS Universal Mobile Telecommunications System
UTRAN Universal Terrestrial RAN

The invention claimed is:

1. A method of enabling contention-based uplink transmission, in a radio base station in a wireless communications system, the method comprising:
   determining configuration information for a plurality of contention-based uplink transmission opportunities;
   transmitting the configuration information to a plurality of user equipments; and,
   for each of the contention-based uplink transmission opportunities, evaluating whether the opportunity is actually available for contention-based transmission and, based on said evaluating, transmitting an access control signal to the user equipments, the access control signal indicating whether contention-based uplink transmission is allowed for the opportunity.

2. The method of claim 1, wherein the configuration information comprises at least one of an uplink transmission resource, an uplink transmission format, and timing information for the plurality of contention-based uplink transmission opportunities.

3. The method of claim 1, wherein the configuration information is included in broadcasted system information.

4. The method of claim 1, wherein the configuration information is included in dedicated configuration messages.

5. The method of claim 1, wherein the access control signal is transmitted in a sub frame immediately preceding a sub frame that comprises an uplink transmission resource corresponding to said opportunity.

6. The method of claim 1, wherein the access control signal indicates a probability that contention-based uplink transmission is allowed for the opportunity.

7. The method of claim 1, wherein the access control signal is transmitted on a physical hybrid automatic repeat request indicator channel.

8. The method of claim 1, wherein the access control signal is transmitted on a physical downlink control channel.

9. A method, in a user equipment in a wireless communications system, of enabling contention-based uplink transmission, the method comprising:
receiving and storing configuration information for a plurality of contention-based uplink transmission opportunities, wherein the configuration information is received from a radio base station;
receiving input data for uplink transmission;
reading an access control signal associated with one of the contention-based uplink transmission opportunities, wherein the access control signal is received from the radio base station and indicates whether contention-based uplink transmission is allowed for the associated opportunity; and
responsive to an indication that contention-based uplink transmission is allowed for the associated opportunity, transmitting at least some of the received input data using said associated opportunity.

10. The method of claim 9, wherein the configuration information comprises at least one of an uplink transmission resource, an uplink transmission format, and timing information for the plurality of contention-based uplink transmission opportunities.

11. The method of claim 9, wherein the configuration information is included in broadcasted system information.

12. The method of claim 9, wherein the configuration information is included in dedicated configuration messages.

13. The method of claim 9, wherein the access control signal is received in a sub frame immediately preceding a sub frame that comprises an uplink transmission resource corresponding to the associated opportunity.

14. The method of claim 9, wherein the access control signal indicates a probability that contention-based uplink transmission is allowed for the associated opportunity, and wherein the method comprises the further step of determining whether contention-based uplink transmission is allowed for the associated opportunity based on the probability.

15. The method of claim 9, wherein the access control signal is received on a physical hybrid automatic repeat request indicator channel.

16. The method of claim 9, wherein the access control signal is received on a physical downlink control channel.

17. A radio base station configured to enable contention-based uplink transmission in a wireless communications system, the radio base station comprising:
a determining circuit adapted to determine configuration information for a plurality of contention-based uplink transmission opportunities, and
a transmitter adapted to transmit the configuration information to a plurality of user equipments, and to evaluate, for each of the opportunities, whether the opportunity is actually available for contention-based transmission, and to transmit, based on the evaluation, an access control signal to user equipments for each of the contention-based uplink transmission opportunities, wherein the access control signal indicates whether contention-based uplink transmission is allowed for the opportunity.

18. A user equipment configured to enable contention-based uplink transmission in a wireless communications system, the user equipment comprising:
a receiver adapted to receive configuration information for a plurality of contention-based uplink transmission opportunities from a radio base station,
a storage circuit adapted to store the received configuration information,
a data input circuit adapted to receive input data for uplink transmission,
a reading circuit adapted to read an access control signal received from the radio base station and associated with one of the contention-based uplink transmission opportunities, wherein the access control signal indicates whether contention-based uplink transmission is allowed for the associated opportunity, and
a transmitter configured to transmit at least some of the received input data using said associated opportunity, responsive to an indication that contention-based uplink transmission is allowed for the associated opportunity.

19. The user equipment of claim 18, wherein the access control signal indicates a probability that contention-based uplink transmission is allowed for the associated opportunity, and wherein the user equipment further comprises a determining circuit adapted to determine whether contention-based uplink transmission is allowed for the associated opportunity based on the probability.

* * * * *

UNITED STATES PATENT AND TRADEMARK OFFICE
CERTIFICATE OF CORRECTION

PATENT NO. : 9,094,942 B2  Page 1 of 1
APPLICATION NO. : 13/580549
DATED : July 28, 2015
INVENTOR(S) : Wiberg et al.

It is certified that error appears in the above-identified patent and that said Letters Patent is hereby corrected as shown below:

In the specification
In Column 1, Line 20, delete "to to improve" and insert -- to improve --, therefor.

Signed and Sealed this
Seventh Day of June, 2016

Michelle K. Lee
*Director of the United States Patent and Trademark Office*